United States Patent [19]

Deleto

[11] 4,062,193

[45] Dec. 13, 1977

[54] BAND LOCK FOR THE IGNITION LOCK OF A MOTOR VEHICLE

[76] Inventor: Vincent Deleto, 25 Greenville Ave., Jersey City, N.J. 07305

[21] Appl. No.: 721,337

[22] Filed: Sept. 8, 1976

[51] Int. Cl.² ............................................. E05B 17/14
[52] U.S. Cl. ......................................... 70/18; 70/237; 70/426; 70/428
[58] Field of Search ............................... 70/15, 18–19, 70/158, 163–164, 166–167, 177–180, 183, 185–186, 209, 211–212, 237, 416–418, 423–428

[56] References Cited

U.S. PATENT DOCUMENTS

| 3,665,738 | 5/1972 | Pescuma | 70/211 |
| 3,811,303 | 5/1974 | Robertson | 70/237 |

Primary Examiner—Robert L. Wolfe

[57] ABSTRACT

A bank lock for the ignition lock on the steering column of a motor vehicle includes a pair of arcuate arms which are hingedly connected at one end thereof and are of sufficient length to encircle a substantial segment of a steering column. A yoke element is carried by one of the arcuate arms and is adapted to be juxtaposed in close overlying relation to the housing of an ignition lock which protrudes from the steering column. One of the arcuate arms terminates in an end extension adapted to be positioned across the keyhole opening of the ignition lock and carries one of a pair of locking elements at its outer extremity. The second of the arcuate arms terminates in an end extension which is directed substantially perpendicularly to the end extension of the first arm and is adapted to be positioned in close relation to a diametrically opposed location of the ignition lock housing from the yoke. The second arm end extension carries the other locking element whereby the band lock can be selectively locked to the steering column to shield the ignition lock against unauthorized access thereto.

3 Claims, 3 Drawing Figures

BAND LOCK FOR THE IGNITION LOCK OF A MOTOR VEHICLE

BACKGROUND OF THE INVENTION

The present invention relates to anti-theft devices for motor vehicles and more particularly to a band lock for an ignition lock mounted on the steering column of the motor vehicle.

Various anti-theft devices have been available heretofore. Generally they have taken the form either of a device whereby the steering wheel is locked or the ignition lock is protected against unauthorized access. The present invention concerns the latter type of protective device. Devices of this nature which have previously been known are generally complex mechanically or require the interposition of elements in the electrical circuit which serve to break the circuit and thus prevent starting of the engine. U.S. Pat. No. 3,665,738 issued May 30, 1972 to Gerald F. Pescuma et al; for example, employs spring-loaded arcuate sections and a pivotable and slidable blocking arm to shield the keyhole opening of the ignition lock. Springs are subject to wear and over a period of time lead to impairment of the intended function of the device.

SUMMARY OF THE INVENTION

It is one object of the invention to provide an anti-theft band lock for shielding the ignition lock of a steering column which is simple in construction and capable of substantially operational longevity.

It is another object of the invention to provide an anti-theft band lock for the steering column ignition lock of a motor vehicle which can easily be installed in place on the steering column or easily removed therefrom.

Other objects and advantages of the invention will become readily apparent from the following description of the invention.

According to the present invention there is provided an anti-theft band lock for the ignition lock mounted on the steering column of a motor vehicle comprising in combination:

first and second arcuate arms hingedly connected at one end thereof and each of sufficient length to encircle a substantial segment of a steering column;

a yoke element on a first of said arms adapted to be juxtaposed in close overlying relation to the housing of an ignition lock protruding from the steering column, said first arm terminating in an end extension adapted to be positioned across the keyhole opening of the ignition lock, said end extension being provided at the outer extremity thereof with one of a pair of locking elements;

the second of said arms terminating in an end extension directed substantially perpendicularly to the end extension of said first arm and adapted to be juxtaposed in close relation to a diametrically opposed location of the ignition lock housing from said yoke said second arm extension having the second of said pair of locking elements whereby the band lock can be selectively locked to the steering column and the ignition lock shielded against unauthorized access thereto.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
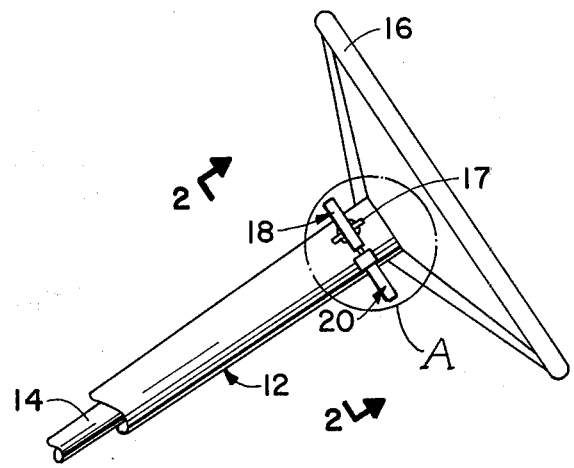
FIG. 1 is a fragmentary perspective view of a steering column of a motor vehicle with the band lock of the present invention applied thereto.
Figure 2:
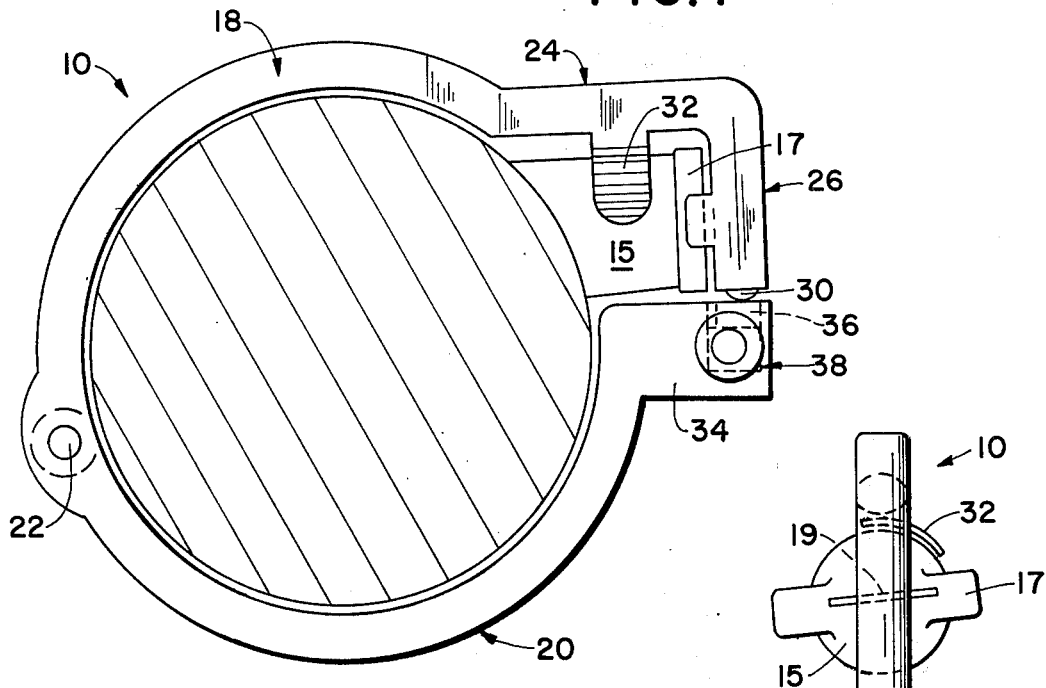
FIG. 2 is an end view of the steering column and band lock shown in FIG. 1, partially in cross-section, taken along line 2—2 thereof.

Referring to the drawings there is shown a band lock 10 secured to the steering column 12 of a motor vehicle. As shown most clearly in FIGS. 1 and 2, the steering column houses a steering shaft 14 and the steering column is surmounted by a steering wheel 16 which is operatively connected in known manner to the shaft 14. A housing 15 extends from the steering column and is fitted with an ignition lock 17 of known construction. The ignition lock is actuated by the insertion of a key (not shown) into a keyhole opening.

The band lock comprises a pair of arcuate arms 18, 20 which are hingedly connected at one end such as by means of a pivot pin or link 22. Each of such arcuate arms is of sufficient length to encircle a substantial segment of the circumference of the steering column.

Figure 3:
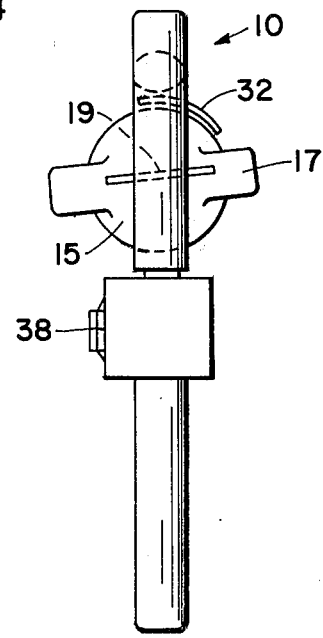
FIG. 3 is an enlargement of insert A shown in FIG. 1.

A first of the arcuate arms 18 is provided with an intermediate section 24 which is generally tangential to the outer surface of the steering column and with an end extension 26 directed perpendicularly to the intermediate section which is adapted to be positioned over the keyhole opening 19 of the ignition lock to thus shield same against unauthorized access thereto. The outer extremity of the end extension is provided with a locking element 30 such as a hasp which is cooperable with a female locking element carried by arcuate arm 20 to be described. Integral with intermediate section 24 of arm 18 is a yoke element 32 which is carried by the arm at a location such that it can be juxtaposed in close overlying relation to the housing 15. As shown most clearly in FIG. 3 the yoke is arcuate and positionable over the upper surface of the lock housing. In this manner once the band lock is applied to the steering column the arm 18 cannot be shifted axially of the steering column.

Arcuate arm 20 terminates in an end extension 34 which is directed substantially perpendicularly to the end extension on arm 18 and is adapted to be juxtaposed in close relation to a diametrically opposed location of the ignition lock housing from the yoke element. In conjunction with the yoke element such end extension 34 prevents circumferential shifting of the band lock. A female locking element 36, such as the entrance of a combination lock 38 is provided in end extension 34 and is cooperable with the locking element 30. Once the band locks is positioned in place around the steering column with the yoke element properly juxtaposed over the lock housing and the end extension 34 adjacent the opposed surface of the housing the locking elements are mated to secure the band lock in place with the end extension 26 located across the keyhole opening thus shielding the keyhole opening against unauthorized entry thereto.

The band lock is thus easily mounted upon the steering column and can easily be removed therefrom by the individual possessing the correct combination of lock 38. It will be understood, of course, that a padlock (not shown) may if desired, be substituted for the combination lock depicted.

The arcuate arms 18, 20 are desirably formed of a hardened steel; however, other suitable materials which are resistant to simple fracture may be employed.

From the foregoing it will be seen that the band lock of this invention is of simple construction, provides adequate denial to the ignition lock, cannot be shifted either axially or circumferentially of the steering column, and is easily removed from the steering column when so required by the owner or other authorized individual.

I claim:

1. An anti-theft band lock for the ignition lock mounted on the steering column of a motor vehicle comprising in combination:

first and second arcuate arms hingedly connected at one end thereof and each of sufficient length to encircle a substantial segment of a steering column, said first arcuate arm having a tangentially extending section angularly spaced by at least 90° from the hinged connection of said arms and an end extension projecting perpendicularly from the outer extremity of said intermediate section adapted to be positioned across the keyhole opening of the ignition lock, said end extension of said first arm being provided at the outer extremity thereof with one of a pair of cooperable locking elements;

an arcuate yoke element integral with the intermediate section of said first arm adapted to be juxtaposed in close overlying relation to and at least partially encircling the housing of the ignition lock protruding from the steering column;

the second of said arms terminating in an end extension directed substantially perpendicularly to the end extension of said first arm and adapted to be juxtaposed in close axial relation to a diametrically opposed location of the ignition lock housing from said yoke, said second arm end extension having the second of said pair of locking elements whereby the band lock can be selectively locked to the steering column and the ignition lock shielded against unauthorized access thereto.

2. A band lock according to claim 1, wherein said second locking element comprises a combination lock.

3. A band lock according to claim 1, wherein said first locking element comprises a hasp.

* * * * *